US010252339B2

United States Patent
Nagai et al.

(10) Patent No.: US 10,252,339 B2
(45) Date of Patent: Apr. 9, 2019

(54) FINE PARTICLE PRODUCTION APPARATUS AND FINE PARTICLE PRODUCTION METHOD

(71) Applicant: Panasonic Intellectual Property Management Co., Ltd., Osaka (JP)

(72) Inventors: Hisao Nagai, Osaka (JP); Takeshi Koiwasaki, Osaka (JP); Daisuke Suetsugu, Osaka (JP); Takafumi Okuma, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 241 days.

(21) Appl. No.: 15/251,840

(22) Filed: Aug. 30, 2016

(65) Prior Publication Data

US 2017/0136546 A1    May 18, 2017

(30) Foreign Application Priority Data

Nov. 12, 2015    (JP) ................................. 2015-221911

(51) Int. Cl.
     *B22F 9/16*      (2006.01)
     *B01J 19/08*      (2006.01)
     (Continued)

(52) U.S. Cl.
     CPC ............... *B22F 9/16* (2013.01); *B01J 19/088* (2013.01); *B22F 9/14* (2013.01); *C01B 21/068* (2013.01);
     (Continued)

(58) Field of Classification Search
     None
     See application file for complete search history.

(56) References Cited

U.S. PATENT DOCUMENTS 4,610,718 A *   9/1986   Araya ....................... B22F 9/14
                                                           264/10
4,881,722 A *   11/1989   Koizumi ................ B01J 19/088
                                                           266/176
(Continued)

FOREIGN PATENT DOCUMENTS

JP      3-089498      4/1991
JP      4-099399 U      8/1992
(Continued)

*Primary Examiner* — George Wysomierski
(74) *Attorney, Agent, or Firm* — Panasonic IP Management; Kerry S. Culpepper (57) ABSTRACT

To provide an apparatus and a method of producing fine particles capable of increasing evaporation efficiency of a material, increasing the production of fine particles and reducing costs by heating the inputted material by a gas heated by thermal plasma. A fine particle production apparatus includes a vacuum chamber, a material feeding device connected to the vacuum chamber and feeding material particles from a material feeding port into the vacuum chamber, electrodes arranged in the vacuum chamber for generating plasma and a collection device connected to the vacuum chamber and collecting fine particles, which produces the fine particles from the material by generating electric discharge inside the vacuum chamber, in which the collection device and the material feeding device are connected by piping, and a material heating and circulation device which heats the material by heat of a gas inside the chamber heated by the plasma through the piping is provided.

6 Claims, 4 Drawing Sheets

(51) Int. Cl.
  *C01B 21/068* (2006.01)
  *C01B 33/021* (2006.01)
  *C01B 33/18* (2006.01)
  *C01F 7/02* (2006.01)
  *B22F 9/14* (2006.01)
  *C01B 32/956* (2017.01)

(52) U.S. Cl.
  CPC .......... *C01B 32/956* (2017.08); *C01B 33/021* (2013.01); *C01B 33/181* (2013.01); *C01F 7/02* (2013.01); *B01J 2219/0875* (2013.01); *B01J 2219/0898* (2013.01); *B22F 2201/013* (2013.01); *B22F 2201/11* (2013.01); *B22F 2201/20* (2013.01); *B22F 2301/10* (2013.01); *B22F 2301/15* (2013.01); *B22F 2301/255* (2013.01); *B22F 2304/05* (2013.01); *B22F 2998/10* (2013.01); *B22F 2999/00* (2013.01)

(56) References Cited

U.S. PATENT DOCUMENTS

| | | |
|---|---|---|
| 5,026,464 A | 6/1991 | Mizuno et al. |
| 5,187,344 A | 2/1993 | Mizuno et al. |
| 5,254,231 A * | 10/1993 | Heath .................. A62D 3/19 204/164 |
| 5,354,962 A | 10/1994 | Mizuno et al. |
| 5,514,349 A | 5/1996 | Parker et al. |
| 6,136,256 A * | 10/2000 | Bingham .......... H01J 37/32431 118/723 R |
| 6,358,375 B1 | 3/2002 | Schwob |
| 2002/0034880 A1 | 3/2002 | Sakai et al. |
| 2008/0277271 A1* | 11/2008 | Layman .................. B22F 9/12 204/164 |
| 2011/0006040 A1* | 1/2011 | Savas .................. C23C 16/24 216/71 |
| 2015/0135514 A1 | 5/2015 | Sasaki et al. |

FOREIGN PATENT DOCUMENTS

| | | |
|---|---|---|
| JP | 6-093309 A | 4/1994 |
| JP | 2002-504057 | 2/2002 |
| JP | 2002-100608 | 4/2002 |
| JP | 2009-285537 | 12/2009 |
| JP | 2010-526664 A | 8/2010 |
| JP | 5318463 B | 10/2013 |
| JP | 2015-099839 | 5/2015 |
| WO | 2008/140823 A1 | 11/2008 |

\* cited by examiner

FINE PARTICLE PRODUCTION APPARATUS AND FINE PARTICLE PRODUCTION METHOD

TECHNICAL FIELD

The technical field relates to a fine particle production apparatus and a fine particle product ion method used for, for example, an electrode material of a lithium-ion battery, a coating material such as a film material of food packaging or an ink raw material used for electric apparatus wiring and so on.

BACKGROUND

In recent years, fine particles in nanometer order are considered to be applied to various devices. For example, metal fine particles of nickel are used for a ceramic capacitor at present, and fine particles with a particle diameter of 200 nanometers or less having good dispersibility are considered to be used for a next generation ceramic capacitor.

Furthermore, fine particles of silicon monoxide (SiOx: x=1 to 1.6) having a lower oxygen content than silicon dioxide are utilized as an antireflection film of an optical lens or a deposition material of a gas-barrier film for food packaging. Recently, application of the fine particles to an anode material of a lithium-ion secondary battery is expected.

Some common methods of producing fine particles in nanometer order include, a method of introducing a bulk material as a raw material together with beads such as ceramic beads and zirconia beads, and miniaturizing the material into particles, a method of melting and evaporating a material and spraying the material to air or water to obtain fine particles and a method of chemically obtaining fine particles by electrolysis or reduction and so on. Among them, a method of producing fine particles in a vapor by using thermal plasm (approximately 10000° C.) such as high-frequency plasma or arc plasma is considered extremely useful because the produced fine particles are excellent in dispersibility with less contamination and composite fine particles formed of plural kinds of materials can be easily composed (for example, refer to Japanese Patent No. 5318463 (Patent Document 1)).

Figure 4:
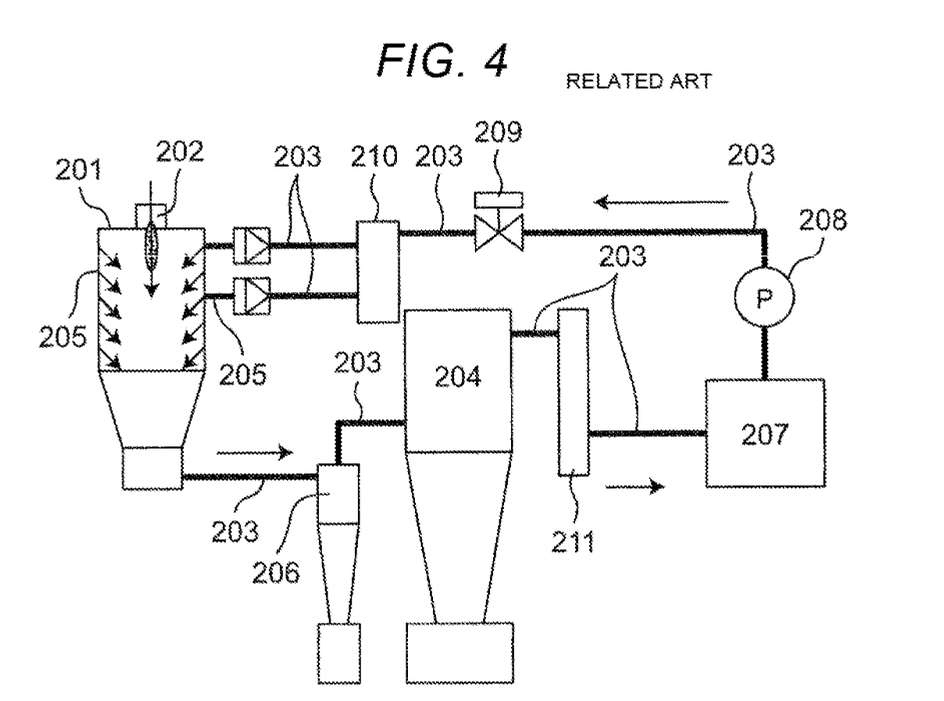
FIG. 4 is a schematic cross-sectional view of a fine particle production apparatus using gas circulation according to a related-art example 1.

FIG. 4 shows a schematic cross-sectional view of a production apparatus of fine particles using thermal plasma according to a related-art example 1.

A plasma generator 202 (high-frequency plasma torch) is provided at a ceiling part of a fine particle generating chamber 201, which is connected to a fine particle collection device 204 through piping 203. Thermal plasma is generated in the plasma generator 202. A material is introduced into the thermal plasma to form fine particles in the fine particle generating chamber 201. After the fine particles are cooled by a cooling gas supplied from a gas supply port 205 in the fine particle generating chamber 201, the fine particles are fed to a cyclone 206 through the piping 203. In the cyclone 206, unevaporated materials or rough particles other than fine particles are separated, and fine particles are fed to the fine particle collection device 204 through the piping 203. The fine particles are collected in the fine particle collection device 204. The fine particle collection device 204 is connected to a surge tank 207 and a circulation pump 208 through the piping 203 and is further connected to the gas supply port 205 through the piping 203, which makes a structure of circulating the gas. An automatic pressure regulating valve 209 and a gas header 210 are provided between the circulation pump 208 and the gas supply port 205 to thereby make variation in the cooling gas quantity stable. A thermal exchanger 211 is installed on an entrance side of the circulation pump 208 to suppress temperature increase of the gas and cool generated fine particles.

SUMMARY

When fine particles are produced by using the above related-art fine particle production apparatus (see FIG. 4), the gas consumption can be suppressed by circulating the gas, and running costs in production of fine particles can be reduced. However, energy used for evaporating the material in power energy inputted for generating thermal plasma is 2 to 5% and it is known that efficiency is extremely low. Accordingly, it is necessary to input a large amount of power for thermal plasma in order to produce a large quantity of fine particles, therefore, it is difficult to increase the production of fine particles.

In view of the above problems, as well as other concerns, a concern of the present disclosure is to provide a fine particle production apparatus and a fine particle production method capable of increasing the production of fine particles and producing fine particles at low cost by improving efficiency of energy utilized for processing with respect to the inputted power energy.

According to an embodiment of the present disclosure, a fine particle production apparatus includes a vacuum chamber, a material feeding device connected to the vacuum chamber and feeding material particles from a material feeding port into the vacuum chamber, electrodes arranged in the vacuum chamber for generating plasma, and a collection device connected to the vacuum chamber and collecting fine particles discharged from the vacuum chamber, which produces fine particles from the material supplied from the material feeding device by the plasma generated inside the vacuum chamber, in which the collection device and the material feeding device are connected by piping, and a material heating and circulation device which heats the material by heat of a gas inside the vacuum chamber heated by the plasma through the piping.

Also according to an embodiment of the present disclosure, a fine particle production method includes generating thermal plasma by electrodes installed in a vacuum chamber, returning a gas heated by the thermal plasma to a material feeding device on a lower side of the vacuum chamber through piping to heat the material in the material feeding device by the returned gas, inputting the heated material from a material feeding port of the material feeding device arranged inside the vacuum chamber into a region of the thermal plasma inside the vacuum chamber, and generating fine particles by evaporating or vaporizing the heated material to be a material gas when passing through the region of the thermal plasma and rapidly cooling the material gas at the moment when the material gas exits from the region of the thermal plasma.

According to the embodiment of the present disclosure, the material is heated by the gas circulating in the piping by the material heating and circulation apparatus and is introduced into the vacuum chamber, thereby reducing energy necessary for evaporating the material by thermal plasma. Accordingly, it is possible to provide a fine particle production apparatus and a fine particle production method capable of improving the efficiency in evaporation of the material by thermal plasma, processing a large quantity of material, increasing the production of fine particles, reducing the gas consumption and producing fine particles at low cost.

DESCRIPTION OF EMBODIMENTS

Hereinafter, embodiments of the present disclosure will be explained in detail with reference to the drawings.

First Embodiment

Figure 1:
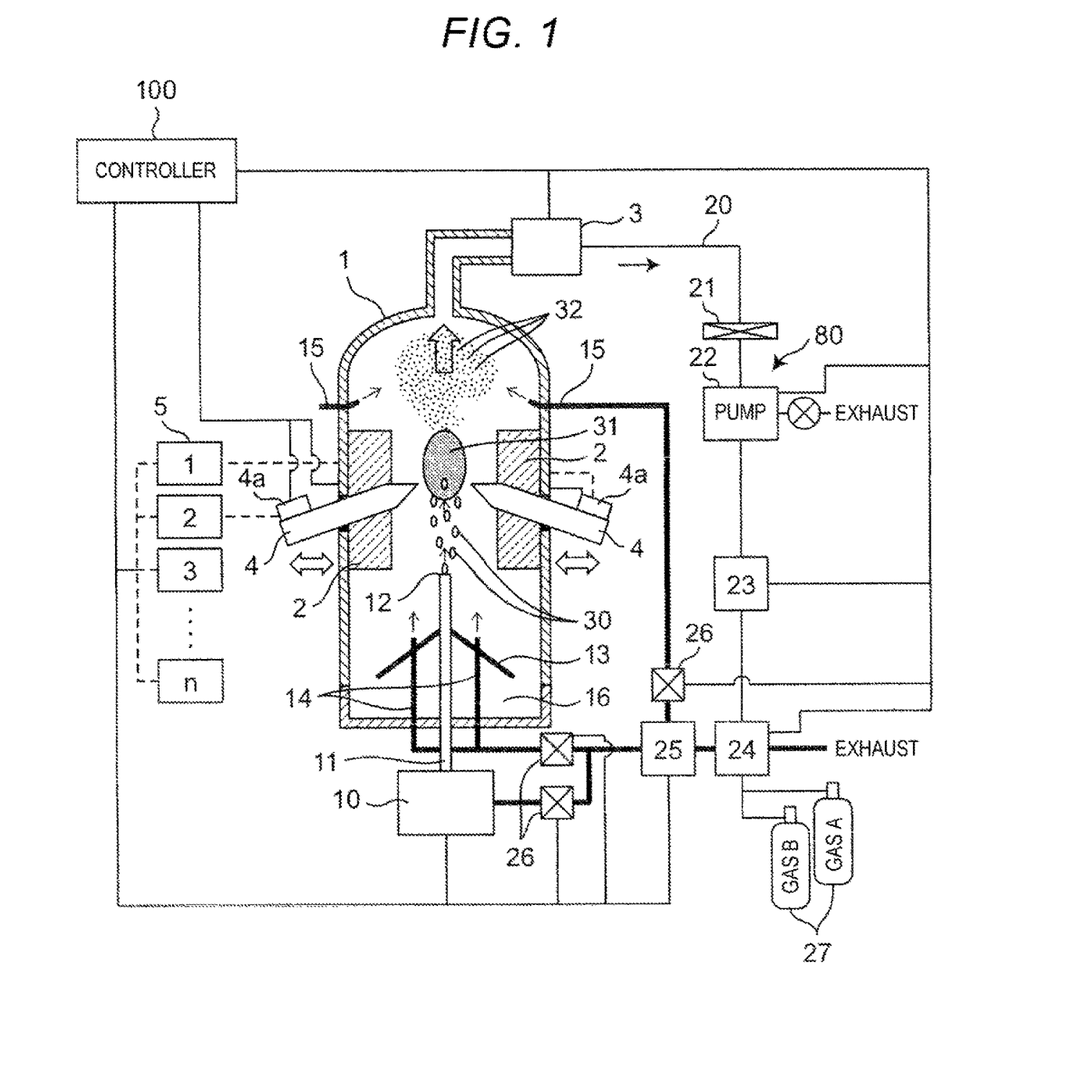
FIG. 1 is a schematic cross-sectional view of a fine particle production apparatus according to a first embodiment of the present disclosure.
Figure 2:
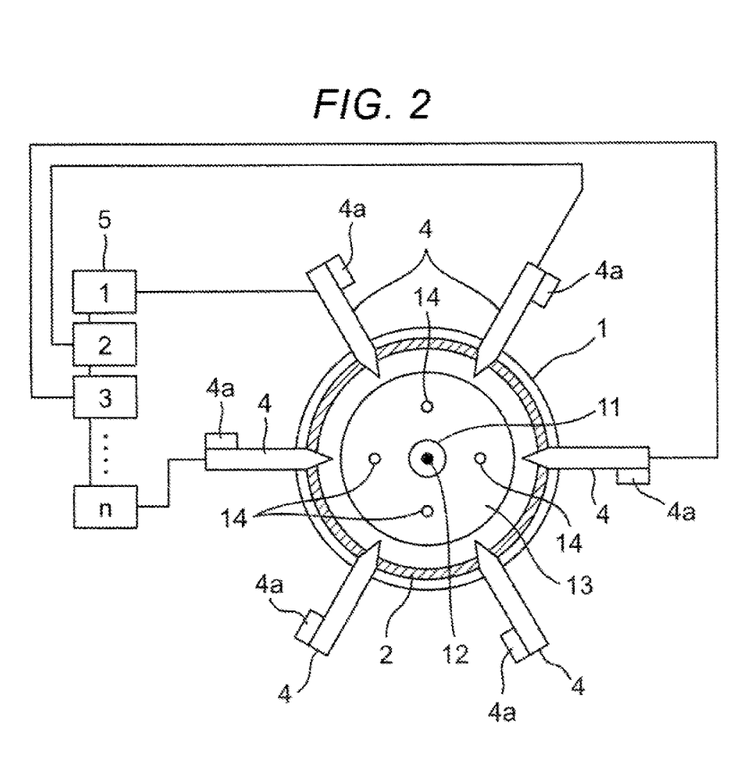
FIG. 2 is a schematic cross-sectional plan view of the fine particle production apparatus according to the first embodiment of the present disclosure.
Figure 3:
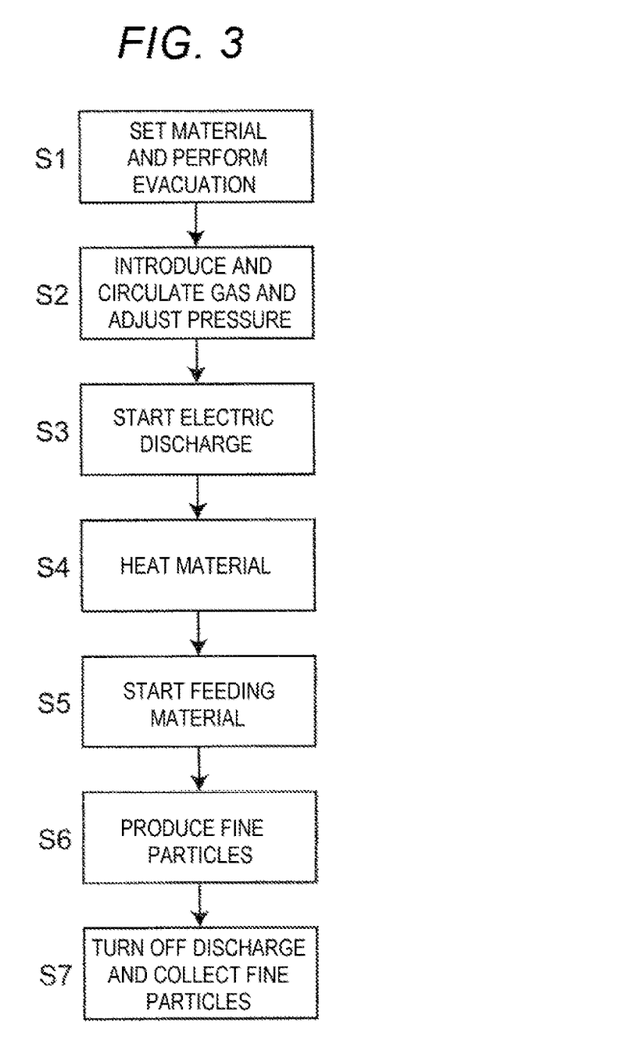
FIG. 3 is a process flow chart according to the first embodiment of the present disclosure.

FIG. 1 shows a schematic vertical cross-sectional view of a fine particle production apparatus according to a first embodiment. FIG. 2 shows a schematic cross-sectional plan view of the fine particle production apparatus according to the first embodiment in a state of being transversely cut at an electrode part. FIG. 3 shows a process flow in the first embodiment. An example of producing fine particles of silicon in nanometer order will be explained with reference to FIG. 1 to FIG. 3.

A fine particle production apparatus according to the first embodiment includes at least a reaction chamber 1 as an example of a vacuum chamber, a material feeding device 10, electrodes for generating arc discharge, for example, a plurality of electrodes 4, a fine particle collection section 3 as an example of a collection device which collects generated fine particles and a material heating and circulation device 80. The material feeding device 10 is arranged below the bottom part of the reaction chamber 1, feeding the material into the reaction chamber 1. The fine particle collection section 3 is arranged so as to connect to an upper end of the reaction chamber 1, collecting fine particles generated in the reaction chamber 1. The plurality of electrodes 4 are arranged at side parts in the center of the reaction chamber 1 at intervals so that tip ends protrude to the inside, which generate plasma inside the reaction chamber 1 and produce fine particles from the material supplied from the material feeding device 10 by the generated plasma.

AC power sources 5 supplying power in different phases are respectively connected to the plurality of electrodes 4, which can respectively apply an AC voltage of 60 Hz in which the phase is shifted by, for example, 60 degrees. Respective electrodes 4 are movable electrodes which move back and forth in radial directions with respect to the center of the reaction chamber 1 by electrode driving devices 4a formed by motors and so on independently.

More specifically, the fine particle production apparatus according to the first embodiment is provided with a material feeding pipe 11 connecting the material feeding device 10 to the reaction chamber 1 and upper-side and lower-side gas supply pipes 14 and 15 connected to be separated from gas piping 20 connecting between the fine particle collection section 3 and the material feeding device 10 to respectively supply the gas to upper and lower regions in the reaction chamber 1 so as to control the flow of the inputted material and the generated fine particles.

The material feeding device 10 is connected to the reaction chamber 1 through the material feeding pipe 11 and supplies the material from the material feeding device 10 into the reaction chamber 1 from the bottom side of the reaction chamber 1. The material feeding pipe 11 is provided to stand from the bottom part of the material feeding device 10 to the vicinity of the central part upward in a vertical direction. A plurality of lower-side gas supply pipes 14 are arranged from the bottom part of the material feeding device 10 in the vicinity of the material feeding pipe 11 along a longitudinal direction of the material feeding pipe 11 (namely, along the vertical direction), which can supply the gas from the lower side of the material feeding port 12 in the vertical direction upward in the vertical direction. A plurality of upper-side gas supply pipes 15 are arranged above the material feeding device 10 toward the upper center, which can supply the gas toward the upper center.

The material heating and circulation device 80 includes the gas piping 20 connecting the reaction chamber 1 to respective devices or respective sections, and a circulation pump 22 arranged in a subsequent stage of the fine particle collection portion 3 in the middle of the gas piping 20. Specifically, the reaction chamber 1, the fine particle collection section 3, the circulation pump 22, the upper-side and lower-side gas supply pipes 15, 14 and the material feeding device 10 are connected by the gas piping 20, the gas heated by plasma in the reaction chamber 1 is discharged from the reaction chamber 1 to the gas piping 20 through the fine particle correction section 3, the discharged gas is fed by the circulation pump 22 so as to circulate and supplies to the reaction chamber 1 through the material feeding device 10 and the upper and lower gas supply pipes 15, 14 to thereby circulate entirely. Consequently, the gas is circulated through the gas piping 20 by driving the circulation pump 22 and the gas heated by plasma inside the reaction chamber 1 is supplied to the material feeding device 10. Material particles (particles of the material) 30 are heated in the material feeding device 10 and supplied to the reaction chamber 1, while the gas heated by plasma inside the reaction chamber 1 can be supplied to the reaction chamber 1 through the upper-side and lower-side gas supplied pipes 15, 14.

The gas piping 20 is configured in a state of being covered with a heat insulating material so that the temperature of heated gas is not significantly reduced.

The circulation pump 22 can evacuate the inside of the reaction chamber 1, the inside of the fine particle collection section 3 and the inside of the material feeding device 10 and can exhaust gas when production operation is started.

More specifically, a subsequent stage side, namely, a downstream side of the circulation pump 22 is connected to the material feeding device 10 through the gas piping 20, and a previous stage, namely, an upstream side of the circulation pump 22 is connected to the fine particle collection section 3 through the gas piping 20.

A pressure regulating valve 21 is attached to a previous stage of the circulation pump 22 as well as a subsequent stage of the fine particle collection section 3, which circulates the gas while regulating the entire pressure of the gas supplied into the gas piping 20.

Furthermore, the apparatus is configured by including a gas partial pressure analyzer 23 as an example of a gas analyzer for measuring the gas and analyzing gas partial pressures or a ratio so that the partial pressures of the circulated gas do not change, and a gas partial pressure regulator 24 for regulating the gas partial pressures by exhausting the gas from the gas piping 20 or introducing the gas from the gas supply device 27 to the gas piping 20 based on the analyzed result of the gas partial pressure analyzer 23. That is, the gas partial pressure analyzer 23 and the gas partial pressure regulator 24 are sequentially arranged in a subsequent stage side, namely, a downstream side of the circulation pump 22 between the circulation pump 22 and the material feeding device 10. A plurality of gas supply devices 27 including a plurality of gas cylinders are connected to the gas partial pressure regulator 24, and pressures of the gases respectively supplied from the plural gas supply devices 27 are regulated by the gas partial pressure regulator 24 based on the analyzed result of the gas partial pressure analyzer 23.

A temperature regulator 25 is further arranged in a subsequent stage of the gas partial pressure regulator 24 in the piping 20 connecting the fine particle collection section 3 and the material feeding device 10, thereby regulating the temperature of the gas flowing inside the piping 20.

Flow-rate regulators 26 regulating respective flow rates of gases are arranged in the piping 20 between the temperature regulator 25 and the upper and lower gas supply pipes 15, 14 and the material feeding device 10.

A controller 100 is respectively connected to the fine particle collection section 3, the material feeding device 10, the material heating and circulation device 80 (circulation pump 22), the gas partial pressure analyzer 23, the gas partial pressure regulator 24, the temperature regulator 25, the flow-rate regulators 26, the AC power sources 5 and the electrode driving devices 4a and controls operations of respective components.

Hereinafter, production operations of the fine particle production apparatus will be explained by following a process flow of FIG. 3.

(Step S1) A material is set and evacuation is performed.

First, a material is set inside the material feeding device 10. The inside of the reaction chamber 1, the inside of the fine particle collection section 3 and the inside of the material feeding device 10 are evacuated by the circulation pump 22, for example, to be several 10 Pa, thereby reducing the effect of oxygen in the air.

(Step S2) The gas is introduced and the pressure is regulated.

Subsequently, gases are supplied from the plural gas supply devices 27 to the material feeding device 10, the lower-side gas supply pipes 14 and the upper-side gas supply pipes 15 through the flow-rate regulators 26 while regulating flow rates of the gases. The supplied gases are circulated while the entire pressure is regulated by the pressure regulating valve 21 attached to the previous stage of the circulation pump 22. The plurality of lower-side gas supply pipes 14 are provided to stand upward in the vertical direction so as to penetrate a conical cover 13 in a lower part around the material feeding pipe 11 in a lower part of the reaction chamber 1 so that the gas is supplied upward in the vertical direction. The upper-side gas supply pipes 15 are provided on a side wall in the vicinity of an upper end of the reaction chamber 1, introducing the gas into the reaction chamber 1 for cooling the produced fine particles 32.

As silicon fine particles are produced as an example in the first example in the first embodiment, the following production processes of fine particles are performed by supplying argon through the two gas supply pipes 14, 15 from the gas supply devices 27 into the reaction chamber 1 to maintain the inside of the reaction chamber 1 in a pressure in the vicinity of the atmospheric pressure under an inert gas atmosphere of argon. It is also preferable to mix a hydrogen gas and a small amount of carbonized gas to be introduced into the reaction chamber 1 from the gas supply devices 27 through the gas supply pipes 14, 15 for promoting the reduction of the material.

(Step S3) Electric discharge starts.

Next, an inner face of the side wall of the reaction chamber 1 having a not-shown water cooling mechanism in the cylindrical side wall has a structure of being covered with a heat insulating material 2 made of a carbon material as an example for keeping the heat of arc discharge (plasma). As an example, six electrodes 4 made of metal which generate the arc discharge are arranged radially at intervals of 60 degrees on a circumferential wall of the reaction chamber 1 in a state where tip ends protrude in a lateral direction (for example, in an upward direction of 5 to 30 degrees with respect to the horizontal direction) in the reaction chamber 1 as shown in FIG. 2. The metal electrodes are cooled by water cooling and by flowing a cooling gas in the electrodes 4 though not specifically shown for reducing evaporation of the metal material.

The tip ends of respective electrodes 4 are arranged so as to direct upward by 5 to 30 degrees from a direction of one plane in the lateral direction. Though six electrodes 4 are radially arranged in the first example, the number of electrodes may be increased as long as the numbers are multiples of 6, or the electrodes may be arranged in multiple stages of two stages, three stages and so on, not limited to be arranged in the same plane. When the electrodes 4 are arranged in multiple stages, the arc discharge as a heat source for evaporating the material can be further expanded in the vertical direction, which is advantageous for generating a large quantity of fine particles. Electrodes of tungsten having a high melting point are used as an example of the material for the electrodes 4, however, electrodes formed of other high-melting point metals such as tantalum or carbon materials may be used.

As shown in FIG. 1 and FIG. 2, arbitrary two electrodes 4 are moved to the central side of the reaction chamber 1 by the electrode driving devices 4a when igniting the arc discharge. After the arc discharge is ignited, the electrodes 4 are respectively moved in the radial directions (directions toward the outside from the central position of the radially arranged electrode 4) by the electrode driving devices 4a while adjusting electric current applied to the electrodes 4 so as to be constant, so that tip ends of the electrodes 4 are positioned apart from the central position of the electrodes 4 until the tip ends are positioned in the vicinity of the wall. Accordingly, the area of the arc discharge as thermal plasma of, for example, approximately 10000° C. is increased and the throughout can be increased. As each electrode driving device 4a, a ball screw is rotated forwardly and reversely by a motor, and the electrode 4 connected to a nut member screwed to the ball screw is moved forward and backward in the axial direction. Though thermal plasma by the arc discharge using the plural electrodes 4 is explained as an example in the embodiment, inductively coupled plasma using a high-frequency power source such as 4 MHz or 13.56 MHz (ICP plasma) may be used.

(Step S4) The material is heated.

Subsequently, when arc discharge 31 is started in the reaction chamber 1, the temperature of the gas discharged from the reaction chamber 1 will high as described above. The high-temperature gas discharged from the reaction chamber 1 is fed from the reaction chamber 1 to a subsequent stage of the reaction chamber 1 through the gas piping 20 by the circulation pump 22 of the material heating and circulation device 80, and the temperature regulation is performed by the temperature regulator 25, then, the gas is returned to the reaction chamber 1 again through the flow-rate regulator 26 after passing though the material feeding device 10 and the gas supply pipes 14, 15. At that time, the high-temperature gas directly contacts the material particles 30 placed in the material feeding device 10, thereby heating the material particles 30.

Furthermore, the gas heated in the reaction chamber 1 by thermal plasma is supplied through the gas piping 20 and the gas supply pipes 14 openings of which are installed in a lower side of the gas material feeding port 12 in the vertical direction by driving the circulation pump 22 of the material heating and circulation device 80. As the gas is supplied in this manner, the material particles 30 are heated until reaching the arc discharge 31, or the velocity at which the temperature of the material particles 30 is reduced can be slowed down. Accordingly, the material particles 30 can be introduced into the arc discharge 31 while keeping the heating temperature of the material particles 30, therefore, evaporation efficiency can be improved.

(Step S5) Feeding of the material is started.

Subsequently, the feeding of the material particles 30 is started with the gas heated by the thermal plasma when the temperature of the material particles 30 in the material feeding device 10 reaches a desired temperature. It is desirable that the heating temperature is 100° C. or more and less than 0.8 times a melting point of the material particles 30, though depending on kinds of the material particles 30. When the temperature is 100° C. or more, a water component adhered to the material particles 30 can be evaporated and the fluidity of the material particles 30 can be increased, which can feed the material particles 30 stably. There is reported that the fluidity of the material particles 30 is improved within a temperature range of 0.6 times or more to less than 0.8 times the melting point of the material particles 30 and gets worse at temperatures of 0.8 times or more. Accordingly, the heating temperature of the material particles 30 is desirably less than 0.8 times the melting point of the material particles 30 to be inputted.

As the material particles 30 to be a raw material of the fine particles 32, silicon powder of approximately 16 micrometers is used and placed inside the material feeding device 10. The particles having 16 micrometers are used in the first example, however, particles with particle diameters larger than 1 micron and 100 micron or less are evaporated by thermal plasma though depending on plasma conditions, therefore, fine particles 32 in nanometer order can be produced by using them. When using material particles 30 with particle diameters larger than 100 micrometers, it is difficult to completely evaporate the material particles 30 and fine particles 32 to be produced may be increased in size. As the material feeding device 10, a locally fluidized powder feeding device can be used as an example. In the locally fluidized powder feeding device, the flow rate of a carrier gas and the feeding amount of the material particles 30 are controlled by the number of rotations of a vessel to which the material particles 30 are introduced, thereby feeding the material particles 30 as a powder material to the material feeding pipe 11 at a constant rate. As other examples of the material feeding device 10, there are a surface-copying powder feeder controlling the distance between the surface of the particle material and a nozzle by using laser and so on or a quantitative powder feeder feeding a fixed quantity of powder material to a groove from a hopper and so on and absorbing the material and so on. Any type of powder material feeding devices can be used, which can be properly used in accordance with the quantity of powder material to be fed.

(Step S6) Fine particles are produced.

Next, the material particles 30 heated with the heated gas are fed from the material feeding device 10 to the material feeding pipe 11 and introduced into the reaction chamber 1 from the material supply port 12 at the upper end of the material feeding pipe 11 with the gas as shown in FIG. 1. The material particles 30 introduced into the reaction chamber 1 with the gas are evaporated or vaporized (hereinafter representatively referred to as "evaporated") when passing through the arc discharge 31, and the material particles 30 are gasified. As the heated material particles 30 are used at this time, energy necessary for increasing the material particles 30 to a temperature of a boiling point or more is reduced as compared with a case where the material particles 30 are not heated. Therefore, in the case where the material particles 30 are heated in advance by the material feeding device 10, processing efficiency is improved as compared with the case where the material particles 30 are not heated, therefore, many particles can be evaporated.

A material gas obtained by evaporating the material particle 30 moves upward inside the reaction chamber 1 by an upward current due to the heat of the arc discharge 31 or the gas flow from the gas supply pipe 14, and at the moment when the gas exits from the region of the arc discharge 31, the material gas is rapidly cooled and spherical fine particles 32 are generated. The cover 13 at the lower part around the material feeding pipe 11 is provided with plural gas supply pipes 14 for feeding the material particles 30 or the fine particles 32 generated by the arc discharge 31 in a fixed direction (upward in the vertical direction), and an atmospheric gas is supplied from the gas supply pipes 14 in the fixed direction (upward in the vertical direction). The material feeding pipe 11 and the material feeding port 12 have not-shown heating mechanisms so that the material particles 30 are not cooled, which are positioned in the lower side of the central position of the plural electrodes 4 in the vertical direction. In particular, the material feeding port 12 at the upper end of the material feeding pipe 11 is arranged to be positioned in a lower part than the region of the arc discharge 31.

Generally, in the arc discharge 31 at a position where the material particles 30 are supplied, the heat of plasma is taken by evaporation of the material particles 30, therefore, the temperature of the arc discharge at the position where the material particles 30 are evaporated is reduced. In the case where the material particles 30 are successively inputted into a continuous discharge such as an inductively-coupled plasma (ICP) torch in related art, the temperature of plasma is reduced due to the evaporation of the material particles 30 and the material particles 30 are not completely evaporated, therefore, fine particles with relatively large diameters are produced and the distribution of particle diameters is deteriorated. The input of the material particles 30 has to be limited for producing the fine particles 32 having a desired particle diameter or for improving the distribution of particle diameters of the produced fine particles 32, which reduces the throughput.

On the other hand, the arc discharge 31 generated by the plural electrodes 4 used in the first example adopts the AC power sources 5 which can supply the power phases of which differ from one another, for example, the power of 60 Hz in which the phase is shifted by, for example, 60 degrees as power sources of the plural electrodes 4, respectively.

Accordingly, the power discharge has a pulse shape, and high-temperature thermal plasma can be constantly generated.

The thermal plasma such as the arc discharge 31 or the ICP torch is a viscous gas, therefore, the material particles 30 do not enter the arc discharge 31 and are not processed if the particles 30 do not have a certain velocity. In the apparatus in which the material feeding device 10 and the material feeding port 12 are installed in the lower side of the arc discharge 31 in the vertical direction, and the material particles 30 are fed from the lower side of the arc discharge 31 in the vertical direction, unprocessed material particles 30 repelled by the arc discharge 31 fall to the lower side in the vertical direction due to the gravity, which can be positively separated from the processed fine particles 32 positioned in the upper part of the arc discharge 31. These unprocessed material particles 30 are accumulated in an unprocessed material reservoir 16 installed in the bottom of the reaction chamber 1 as well as in the lower side of the material feeding port 12. The material accumulated in the unprocessed material reservoir 16 can be returned to the material feeding device 10 and can be used again, which can increase the material use efficiency.

(Step S7) The discharge is stopped and fine particles are collected.

Subsequently, the fine particles 32 generated by the arc discharge 31 and lighter than the gravity are collected by the fine particle collection section 3 by the flow of the gas from the gas supply pipes 14 or the flow of the cooling gas from the gas supply pipes 15 as shown in FIG. 1. A cyclone which can classify particles having an arbitrary particle diameter or more and a bag filter which can collect desired fine particles are installed in the fine particle collection section 3, though not shown. The bag filter for collecting fine particles can use a filter formed of silica fibers having high heat resistance as an example as the high-temperature gas is circulated. As there is a danger of fire when the collected fine particles are taken to the air, the fine particles are left under an atmosphere containing approximately 1% air (gas containing oxygen) and taken out to the air after a gradual oxidation process is performed. Accordingly, surfaces of silicon fine particles are oxidized, for example, in a range of about 1 to 2 nanometers, therefore, they can be safely taken out. The silicon fine particle having, for example, 10 to 300 nanometers can be collected from the bag filter through the processes.

The method of producing silicon (Si) fine particles in nanometer order has been explained in the first example, and fine particles may be produced by using metals such as nickel (Ni), silver (Ag) and copper (Cu) and inorganic materials such as glass ($SiO_2$), silicon nitride (SiN) and alumina ($Al_2O_3$) as materials for producing fine particles. It is also possible to produce fine particles of, for example, silicon monoxide ($SiO_x$: x=1 to 1.6) silicon nitride ($SiN_x$: x=0.1 to 1.3) or silicon carbide ($SiC_x$) by using silicon materials by causing materials to react with the gas introduced into the reaction chamber 1. The method can also be applied to generation of composite materials including plural materials which have a silicon core inside them and are covered with alumina or silicon carbide and so on in the outside.

The gas partial pressure analyzer 23 and the gas partial pressure regulator 24 are installed in the subsequent stage of the circulation pump 22 for circulating the gas as shown in FIG. 1, which are used when two or more kinds of gases are used. As an example, there is a case where a hydrogen gas is added to the argon gas which is normally used for promoting reduction reaction to perform processing. A quadrupole mass spectrometer (QMS) is used as the gas partial pressure analyzer 23 as an example. The QMS can ionize part of the gas passing through the gas piping 20 by a filament attached to a tip end, and can separate ions with different masses by applying an electric field to quadrupoles. Accordingly, kinds of gases in the gas introduced into the gas partial pressure analyzer 23 can be grasped and partial pressures of respective kinds of gases can be estimated. The gas partial pressures are regulated by the gas partial pressure regulator 24 so that the gas partial pressures (for example, a ratio between argon and hydrogen) set in producing conditions of fine particle are constant based on measurement result of the gas partial pressure analyzer 23. In the case where the gas partial pressures are deviated from the desired set gas partial pressures as a result of the gas partial pressure measurement by the gas partial pressure analyzer 23, the gas partial pressures (for example, the ratio between argon and hydrogen) are regulated so as to be constant by adding an insufficient gas from the gas supply device 27 connected to the gas partial pressure regulator 24 by the gas partial pressure regulator 24. Accordingly, stable processing can be performed for along period of time.

Although the QMS is used as an example of the gas partial pressure analyzer 23, a Fourier transform infrared spectrophotometer (FTIR) device which can optically analyze kinds of gases may be used. The fine particle production using two kinds of gases has been explained, however, three or more kinds of gases may be mixed. For example, when a small amount of hydrogen gas and carbide gas are added to the argon atmosphere for reducing the silicon material, the reduction reaction is further promoted. Also in this case, the stable processing can be performed by adjusting the ratio of respective gases by using the same method as the above and supplying the gas to the material feeding device 10 and the gas supply pipes 14, 15.

According to the first embodiment, materials are heated by the gas circulated in the gas piping 20 using the material heating and circulation device 80 and introduced into the reaction chamber 1 to heat material particles 30 by the heat generated from thermal plasma, thereby reducing energy necessary for evaporating the material by thermal plasma. Accordingly, evaporation efficiency of the material particles 30 at the time of introduction to the thermal plasma is increased, and a large quantity of material particles can be processed. Therefore, the fine particle production apparatus and the fine particle production method capable of increasing the production of fine particles and reducing gas consumption to thereby produce fine particles at low cost can be provided.

Also according to the first embodiment, the AC power sources 5 are respectively connected to the plural electrodes 4 to thereby produce the arc discharge 31, therefore, the area of thermal plasma by the arc discharge 31 for evaporating the material particles 30 can be increased as compared with other methods, and a large quantity of material can be processed.

Also according to the first embodiment, the heat generated from thermal plasma is reused, therefore, energy use efficiency is increased. Additionally, the gas consumption can be reduced by reusing the gas, and fine particles can be produced at low cost.

Also according to the first embodiment, partial pressures of gas kinds are analyzed at the time of circulating the gas and the gas partial pressures are regulated, thereby performing processing stably for a long period of time.

The present disclosure is not limited to the above embodiments, and can be achieved in other various manners. For example, a secondary material heating mechanism which directly heats the material particles 30 by using resistance heating may be provided in the material reservoir for storing the material particles 30 in the material feeding device 10. For example, when the fine particle production apparatus is first driven and the gas not sufficiently heated in the reaction chamber 1 circulates in the gas piping 20, or when the gas is supplied from the gas supply device 27 into the gas piping 20, the temperature of the gas is low, therefore, the gas can be heated secondarily by the secondary material heating mechanism. Accordingly, the temperature control of the material particles 30 can be performed more easily.

The controller 100 can be a microcontroller or a processor and associated memory sources. The controller can be configured according to instructions stored in the memory sources or logic. For example, the controller 100 can be configured to send control signals and receive information from the fine particle collection section 3, the material feeding device 10, the material heating and circulation device 80 (circulation pump 22), the gas partial pressure analyzer 23, the gas partial pressure regulator 24, the temperature regulator 25, the flow-rate regulators 26, the AC power sources 5 and the electrode driving devices 4a in order to perform steps S1-S7.

Arbitrary embodiments or modification examples in the above various embodiments and modification examples are suitably combined, thereby obtaining advantages possessed by respective examples. Embodiments can be combined with each other, examples can be combined with each other or embodiments and examples can be combined with each other, furthermore, features in different embodiments or examples can be also combined.

The fine particle production apparatus and the fine particle production method according to the present disclosure can process a large quantity of materials efficiently by reusing exhaust heat from plasma for heating the material, which can increase the production quantity of fine particles and can produce fine particles at low cost. Accordingly, the present disclosure is useful as the fine particle production apparatus and the fine particle production method used for devices in which mass production is required such as a lithium-ion secondary battery or a ceramic capacitor.

What is claimed is:

1. A fine particle production apparatus comprising:
   a vacuum chamber;
   a material feeding device connected to the vacuum chamber, the material feeding device configured to feed material particles from a material feeding port into the vacuum chamber;
   electrodes arranged in the vacuum chamber for generating plasma; and
   a collection device connected to the vacuum chamber, the collection device configured to collect fine particles discharged from the vacuum chamber, the fine particles produced from the material supplied from the material feeding device by the plasma generated inside the vacuum chamber,
   wherein the collection device and the material feeding device are connected by piping, and
   a material heating and circulation device having a circulation pump provided in the piping that feeds gas discharged from the vacuum chamber to the material feeding device and the fine particles to the collection device.

2. The fine particle production apparatus according to claim 1, further comprising:
   a temperature regulator arranged in the piping connecting the collection device and the material feeding device, the temperature regulator configured to regulate the temperature of the gas flowing in the piping.

3. The fine particle production apparatus according to claim 1,
   wherein the electrodes for generating the plasma are a plurality of electrodes arranged in the vacuum chamber, tip ends of which protrude inside the vacuum chamber to generate plasma.

4. The fine particle production apparatus according to claim 3, further comprising:
   AC power sources respectively connected to the plural electrodes and supplying power in different phases,
   wherein the power in different phases is supplied to respective plural electrodes from the AC power sources to generate arc discharge and to generate the plasma.

5. A fine particle production apparatus comprising:
   a vacuum chamber;
   a material feeding device connected to the vacuum chamber, the material feeding device configured to feed material particles from a material feeding port into the vacuum chamber;
   electrodes arranged in the vacuum chamber for generating plasma; and
   a collection device connected to the vacuum chamber, the collection device configured to collect fine particles discharged from the vacuum chamber, the fine particles produced from the material supplied from the material feeding device by the plasma generated inside the vacuum chamber, wherein the collection device and the material feeding device are connected by piping,
   a material heating and circulation device configured to heat the material by heat of a gas inside the vacuum chamber heated by the plasma, the gas provided through the piping; and
   lower-side gas supply pipes separated to be connected to plural positions of the vacuum chamber through flow-rate regulators in the piping connecting the collection device and the material feeding device,
   wherein the lower-side gas supply pipes supply the gas inside the vacuum chamber heated by the plasma from the lower side of the material feeding port in a vertical direction into the vacuum chamber through the piping and the lower-side gas supply pipes.

6. A fine particle production apparatus comprising:
   a vacuum chamber;
   a material feeding device connected to the vacuum chamber, the material feeding device configured to feed material particles from a material feeding port into the vacuum chamber;
   electrodes arranged in the vacuum chamber for generating plasma; and
   a collection device connected to the vacuum chamber, the collection device configured to collect fine particles discharged from the vacuum chamber, the fine particles produced from the material supplied from the material feeding device by the plasma generated inside the vacuum chamber, wherein the collection device and the material feeding device are connected by piping,
   a material heating and circulation device configured to heat the material by heat of a gas inside the vacuum chamber heated by the plasma, the gas provided through the piping;

a gas analyzer arranged in the piping connecting the collection device and the material feeding device, the gas analyzer configured to analyze partial pressures or a ratio of respective kinds of gases; and a gas partial pressure regulator arranged in the piping, the gas partial pressure regulator configured to regulate gas partial pressures by exhausting the gas or introducing the gas with respect to the piping based on the analysis result by the gas analyzer.

* * * * *